Aug. 30, 1960 F. A. BLANK 2,950,646
BLINDS FOR LIGHT APERTURES IN COMBINED CAMERA AND PROJECTOR
APPARATUS AND OPERATING MECHANISM THEREFOR AND
FOR SHIFTING SHUTTER MEANS
Filed Feb. 28, 1958 7 Sheets-Sheet 1

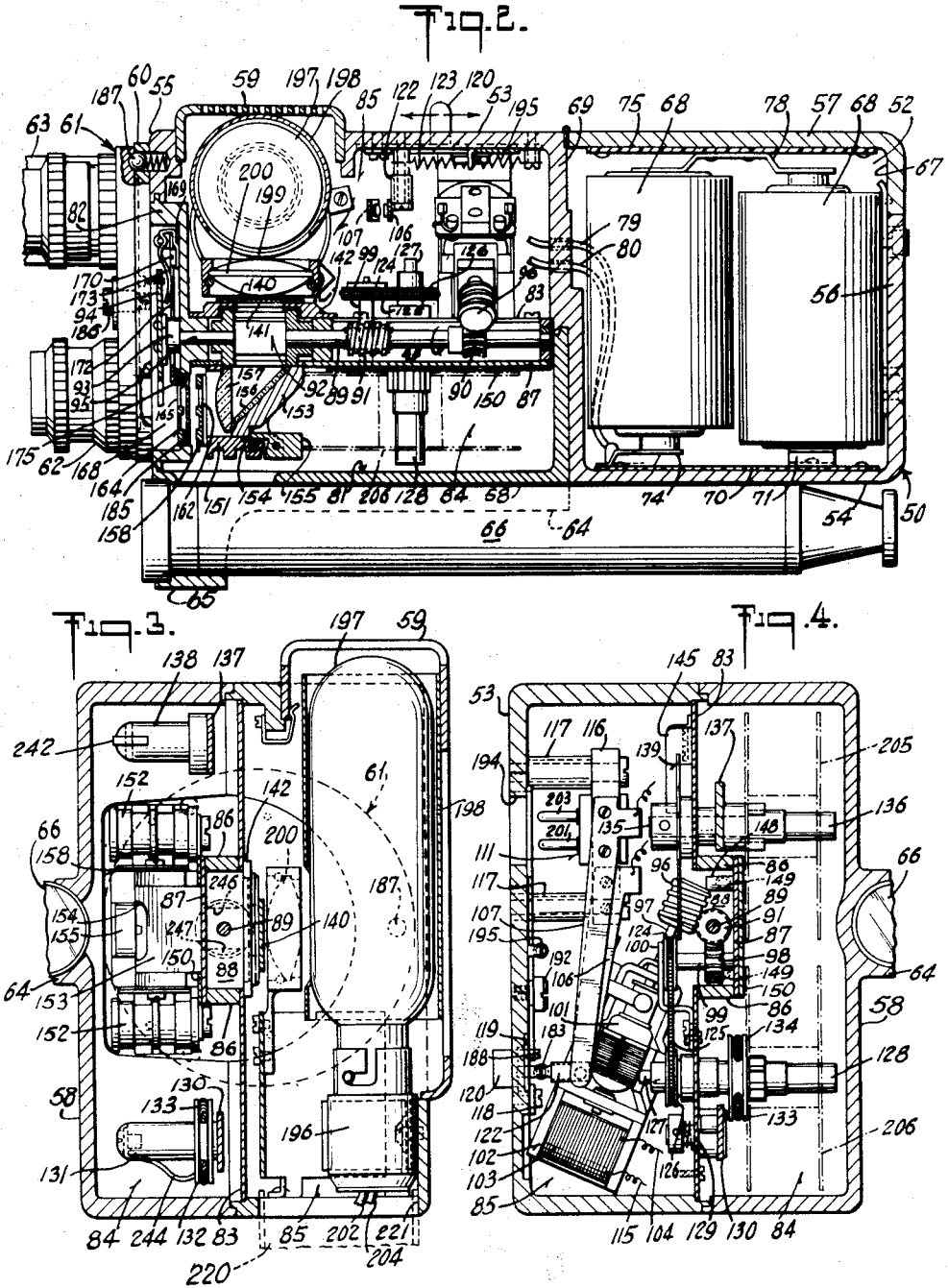

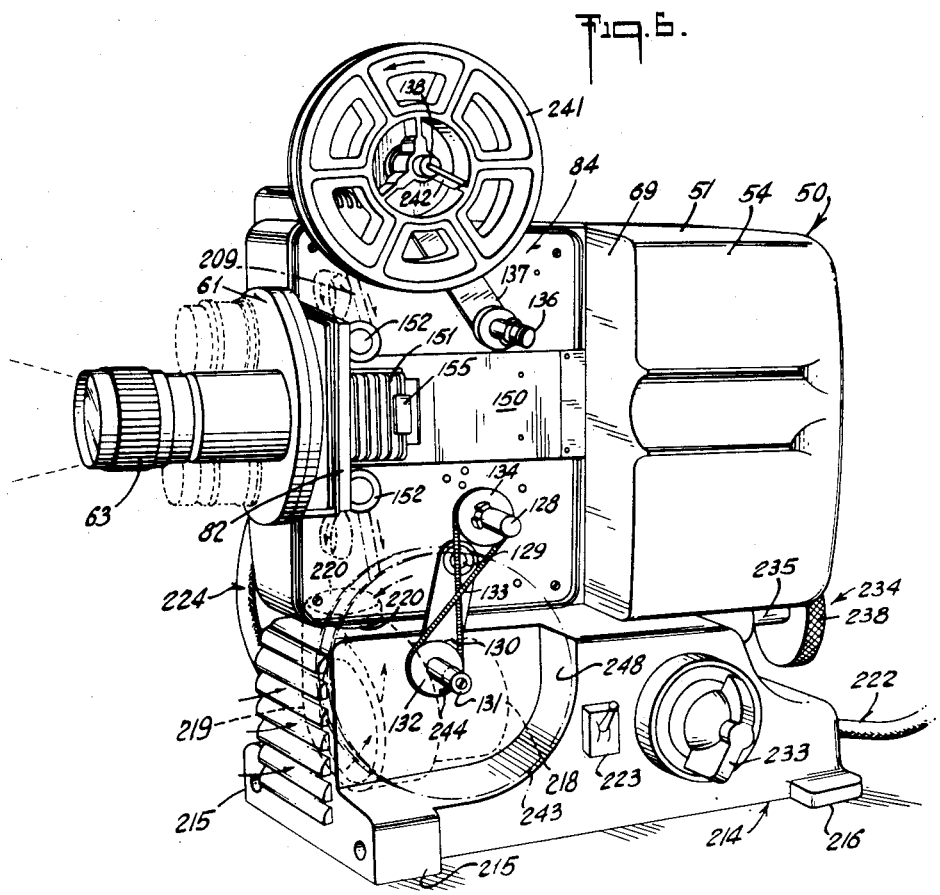

Aug. 30, 1960  F. A. BLANK  2,950,646
BLINDS FOR LIGHT APERTURES IN COMBINED CAMERA AND PROJECTOR
APPARATUS AND OPERATING MECHANISM THEREFOR AND
FOR SHIFTING SHUTTER MEANS
Filed Feb. 28, 1958  7 Sheets-Sheet 4
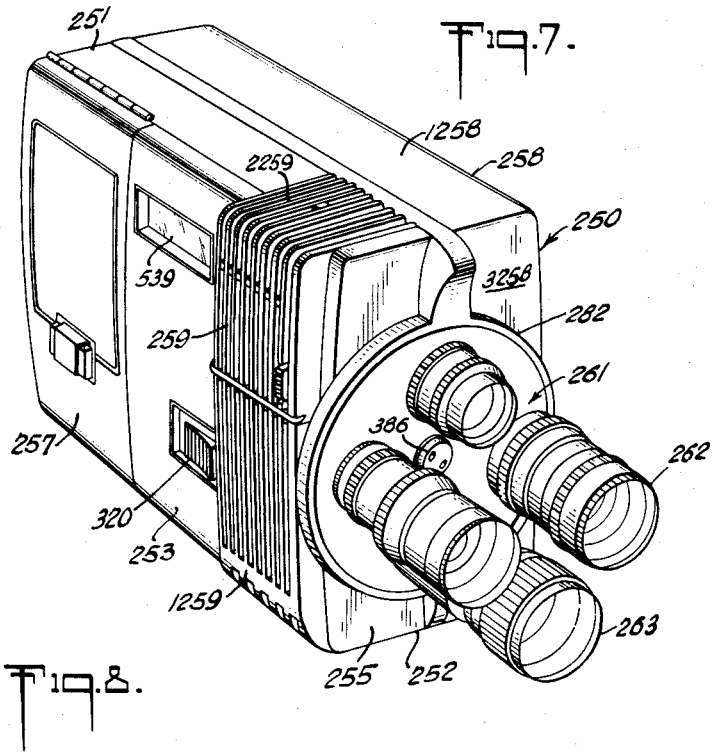
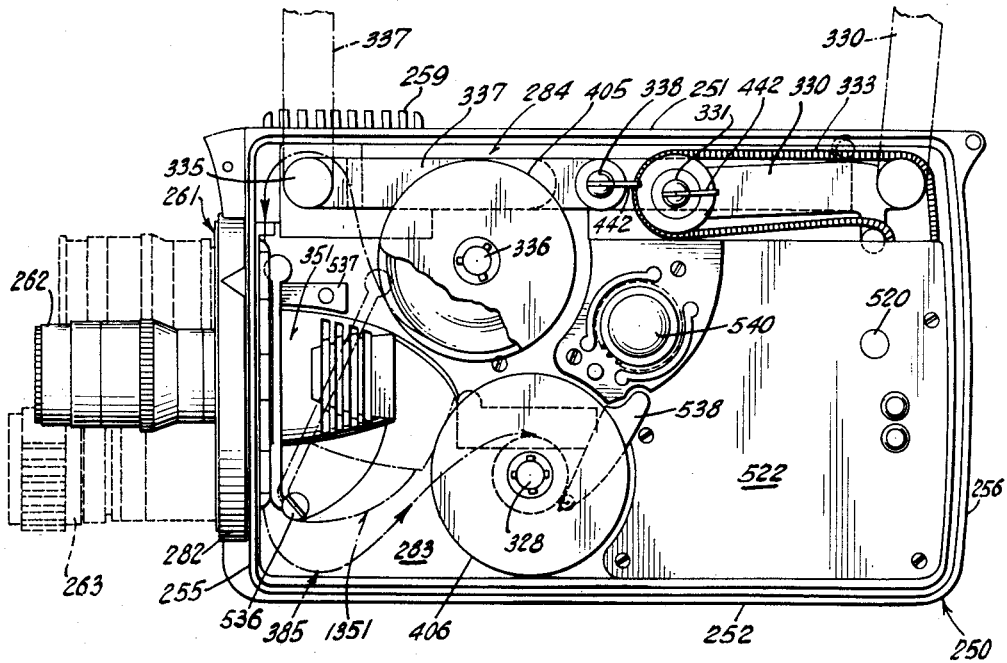

Aug. 30, 1960 F. A. BLANK 2,950,646
BLINDS FOR LIGHT APERTURES IN COMBINED CAMERA AND PROJECTOR
APPARATUS AND OPERATING MECHANISM THEREFOR AND
FOR SHIFTING SHUTTER MEANS
Filed Feb. 28, 1958 7 Sheets-Sheet 5
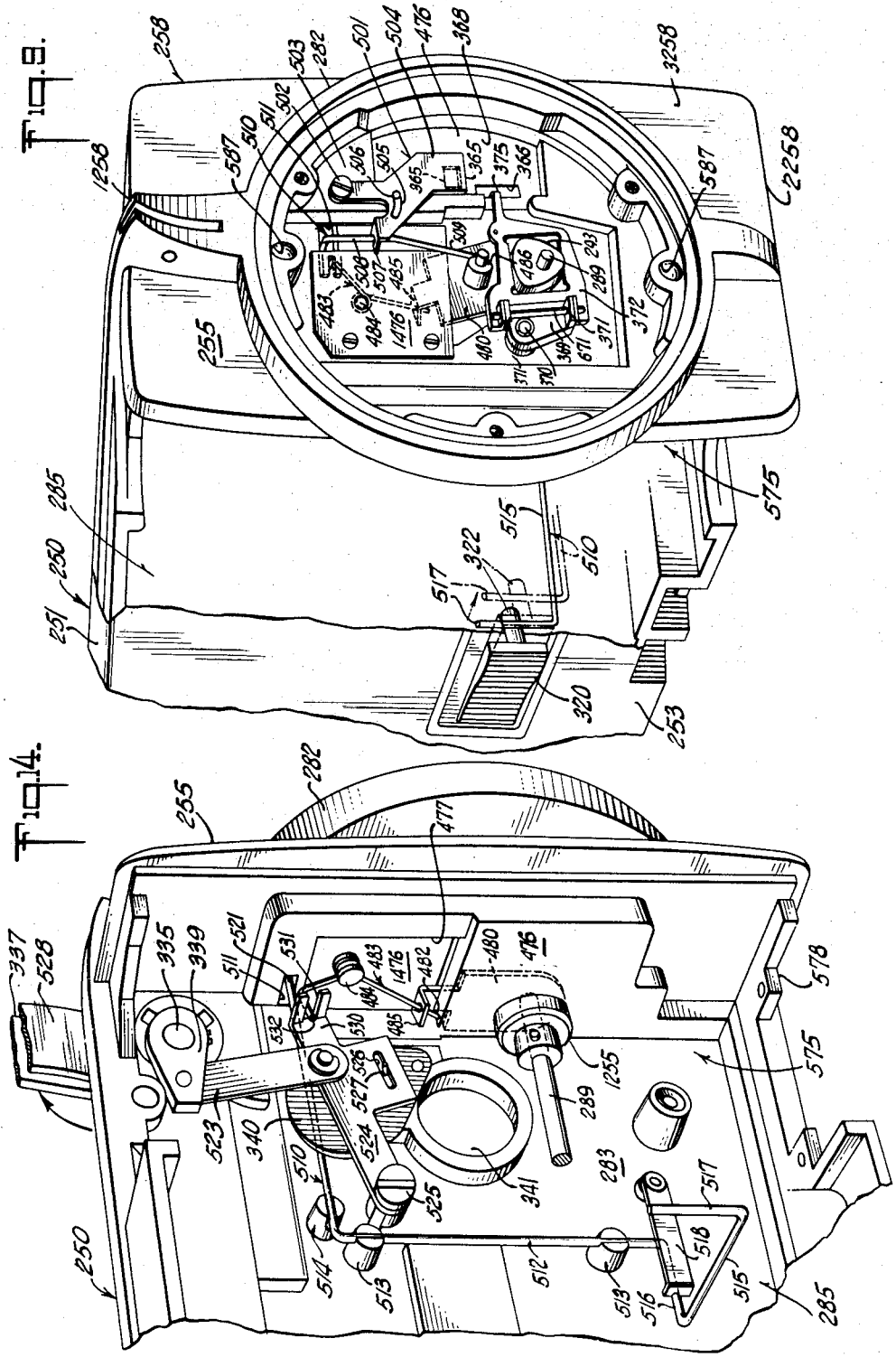

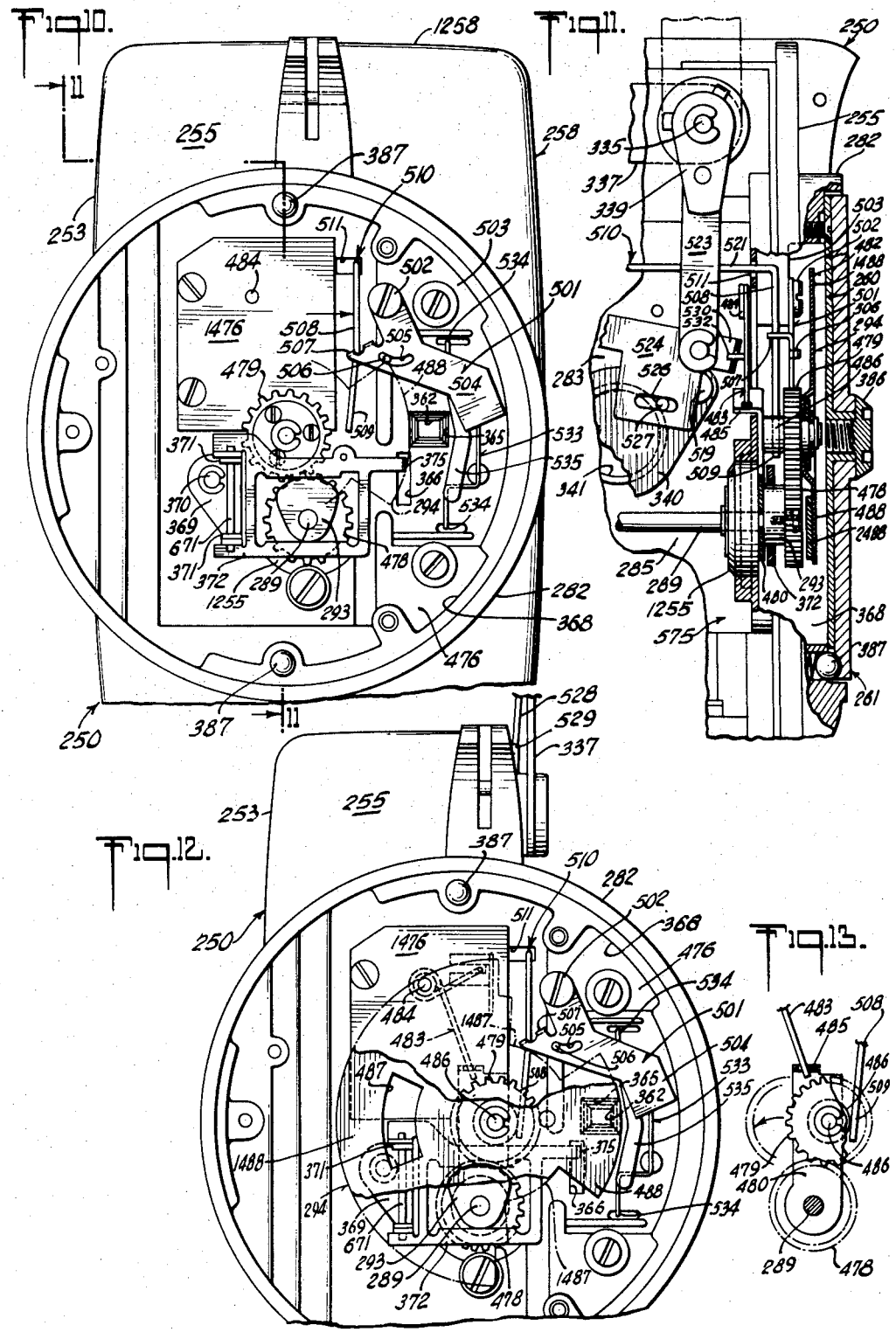

United States Patent Office 2,950,646
Patented Aug. 30, 1960

2,950,646

BLINDS FOR LIGHT APERTURES IN COMBINED CAMERA AND PROJECTOR APPARATUS AND OPERATING MECHANISM THEREFOR AND FOR SHIFTING SHUTTER MEANS

Fritz Albert Blank, New Rochelle, N.Y., assignor, by direct and mesne assignments, of one-half to A. Kip Livingston, West Hempstead, N.Y., and one-half to Longines-Wittnauer Watch Co., Inc., New York, N.Y., a corporation of New York Filed Feb. 28, 1958, Ser. No. 718,264

10 Claims. (Cl. 88—17)

The present invention relates to an improvement in apparatus which may be used both to take moving pictures and to project them and, more particularly, to blinds for light apertures therein to protect unexposed film in the camera unit when the latter is being used for camera operation, the blinds operating mechanism being suitable also for shifting shutter means, such improvements being designed for advantageous use in apparatus of the type proposed in the pending application of John W. Oxberry, Serial No. 405,543, filed January 22, 1954, now U.S. Patent No. 2,912,898.

A general object of the present invention is to provide such blinds for light apertures in apparatus of this type which will effectively and automatically close off the gate aperture in the camera unit except when it is being used to take pictures in camera operation or as the superstructure of the combination apparatus when employed in projecting pictures, and associated blind structure for closing off the light aperture between a projector light source and the film gate when the unit is employed on camera operation, so as effectively to protect unexposed film in the unit; and operating mechanism for such blinds which may efficiently effect shift of shutter means common to both operations.

A more specific object of the present invention is to provide in such a unit a blind for film track and gate apertures, normally held to closed position and automatically moveable to open position when the unit is set up on a base unit and arranged for projection operation, such blind being automatically manipulated in like fashion when the unit is employed as a camera with the blind being opened by manipulation of the electrical control which causes battery-powered mechanism in the unit to be operated in the taking of pictures, the conditioning of the device for projection operation also automatically opening the blind for the passage aperture between the projection light source and the film gate while being inoperable upon camera operation so as to maintain the passage aperture closed to prevent leakage of light therethrough to unexposed film in the camera unit.

Another object of the present invention is to provide in such camera-projector unit certain means to shift common shutter means between a camera position and a projection position which is operable by the blind operating means whereby conditioning of the blinds for projection operation automatically effects shift of the shutter means from its position for camera operation to its position for projection operation.

A further object of the invention is to provide an embodiment of such combined camera and projector apparatus equipped with such blinds and their operating mechanism including operating means for shiftable shutter means in forms which are readily constructed and assembled in the apparatus in an economical manner while assuring efficient operation in a simple way without requiring any additional manipulative effort.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

Fig. 2 is a longitudinal lateral section to an enlarged scale of the camera unit shown in Fig. 1, and taken on line 2—2 thereof;

Fig. 3 is a transverse section to an enlarged scale, taken substantially on line 3—3 of Fig. 1, with parts broken away, a lamp cooling blower duct to be inserted in the unit for projection operation being indicated in dotted lines;

Fig. 4 is a section similar to Fig. 3 taken substantially on line 4—4 of Fig. 1, with parts broken away;

Fig. 6 is an elevational perspective of the camera-projector apparatus which employs the camera unit of Figs. 1 to 5 incl. with a suitable supporting base unit, showing these units as used together for projecting pictures, A.C. motor and blower equipment in the base unit being indicated in dotted lines;

Fig. 7 is a perspective view of another embodiment of the camera unit as designed for the commercial market which embodies the blinds of the present invention but differs in structural details from the embodiment shown in Figs. 1 to 6 incl.;

Figure 15:
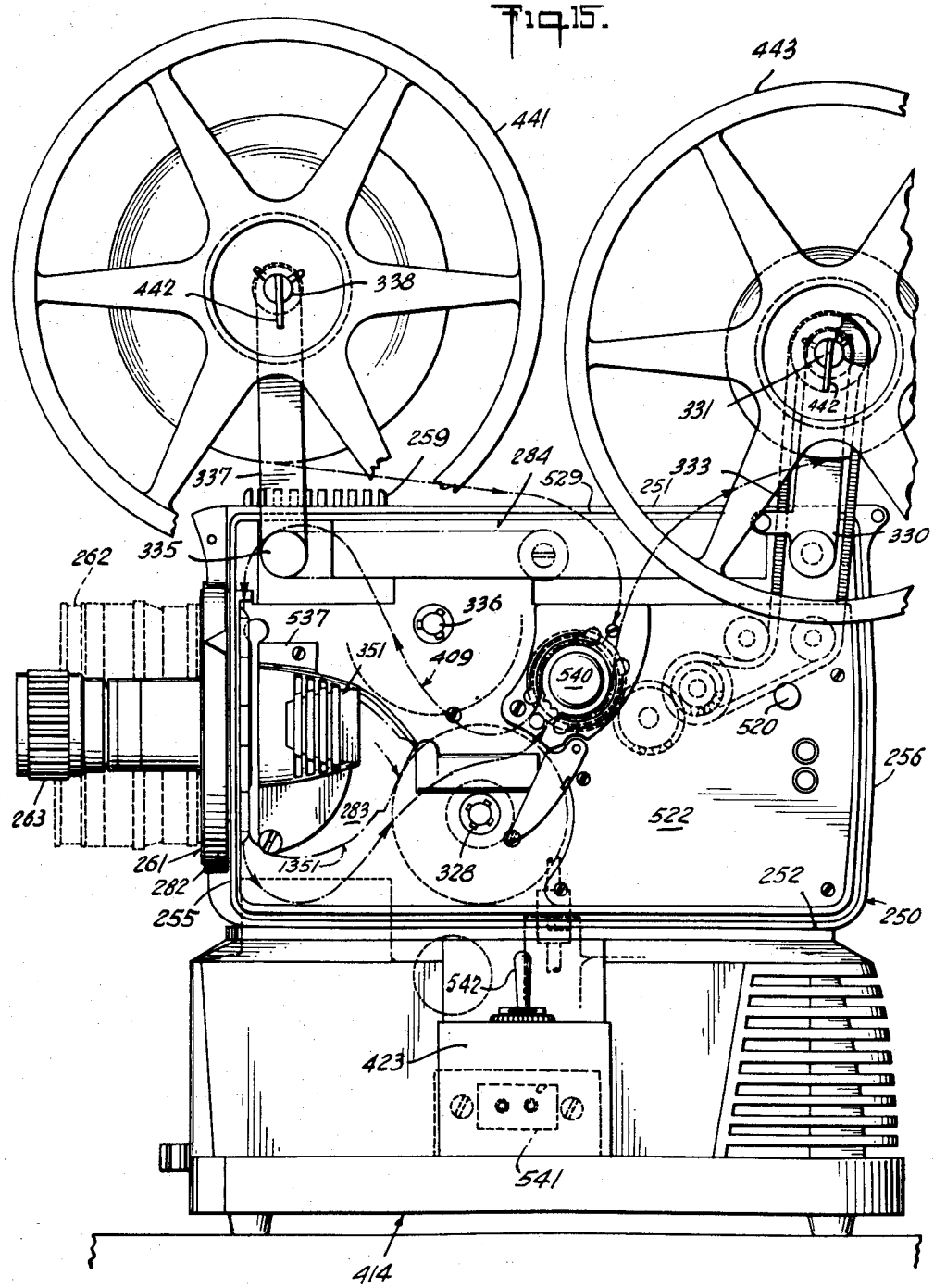

Fig. 8 is a side elevational view of the camera unit of Fig. 7 as seen from the left side thereof and with the left side cover removed to permit viewing of internal mechanism, the camera lens being shown in full lines with other lenses including the projector lens being indicated in dotted lines, the projection reel-supporting arms being shown in their folded positions in the full lines and their extended projection positions being indicated in dot-dash lines, and with the open position of the gate unit being indicated in dot-dash lines, parts being broken away;

Fig. 9 is a front elevational perspective to enlarged scale of camera unit structure shown in Fig. 8, the lens turret being removed to permit observation of the film track aperture blind and other mechanism located in the head chamber in their relative positions prior to picture taking operation, and with parts broken away;

Fig. 10 is a front elevational view, with parts broken away, of the camera unit shown in Fig. 9, structures thereof being in their relative positions of picture taking operation;

Fig. 11 is a sectional view, with parts broken away, taken substantially on line 11—11 of Fig. 10, but with the rotary shutter sectioned on a plane arranged at substantially 90° to the plane of sectioning of other parts for clarity;

Fig. 12 is a front elevational view with parts broken away somewhat similar to Fig. 10 showing the mechanisms in the head chamber of the camera unit as arranged for projection operation;

Fig. 13 is a detailed view, with parts broken away and in section, of shutter shifting mechanism shown in Fig. 12;

Fig. 14 is an elevational perspective view of the device shown in Fig. 12, with parts removed and broken away, permitting observation of other blind mechanism of the present invention as seen from back of the head structure when the camera unit is conditioned to serve as the superstructure unit of the entire apparatus for use on projection operation; and Fig. 15 is a side elevational view, with parts broken away, of a combined camera-projector apparatus employing the camera unit of Figs. 7 to 14 inclusive as the superstructure thereof.

The present invention may be incorporated to advantage in a combined camera and projector apparatus of the type illustrated in Figs. 1 to 6 incl. As shown therein the camera superstructure unit 50 may comprise a casing means 50 including top 51, bottom 52, right side 53, left side 54, front 55 and back 56 panel portions, which are mounted together to provide with other elements suitable frame structure. The right side also includes a hinged door 57, which closes a battery compartment, and the left side includes a removable dished panel or cover plate 58, which closes a middle mechanism compartment. A removable, perforated or slotted cover 59 closes a light source or lamp compartment on the right side of the casing 50. The front panel portion 55 carries a circular front wall cover plate 60 on which is rotatably mounted a lens turret 61 carrying a plurality of lenses including a camera lens 62 and a projector lens 63 for selective alignment with a common optical window or aperture in the position of the camera lens 62 in Figs. 1, 2 and 3. Left side panel portion 54 and the compartment-closing panel 58 cooperatively carry a saddle 64 and loop or ring 65 adapted together slidably to receive and hold in the illustrated position a telescopic finder 66.

Figure 1:
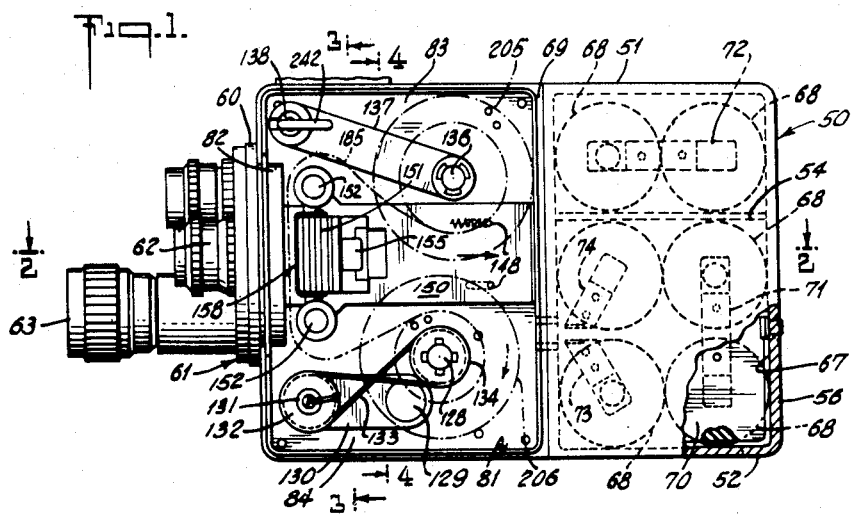
Fig. 1 is a side elevational view of the camera unit of one embodiment of combined camera and projector apparatus in which the blinds improvement of the present invention may be employed to advantage, the left side cover of the camera unit being removed and parts being broken away and shown in section in order to show internal parts.

As illustrated in Figs. 1 and 2 the casing 50 has defined therein a rear compartment 67 designed to carry a plurality of batteries 68—68, such as size (D) dry cells, preferably six in number. Rear compartment 67 is defined by top panel portion 51, bottom panel portion 52, back panel 56, left side panel 54, right side door 57 and a fixed cross or transverse rear partition 69. The left side wall portion 54 is lined with a sheet 70 of insulating material which carries on the inner face thereof electrically conductive straps 71 and 72 and terminal straps 73 and 74. The inner face of the door 57 is also lined with a sheet 75 of insulating material carrying electrically conductive straps 76, 77 and 78 which, together with the straps 71 and 72, connect the dry cells 68—68 in series between the terminal straps 73 and 74. Terminal wires 79 and 80 are extended through holes in the cross wall 69, as is best seen in Fig. 2, and are respectively connected to the terminal straps 73 and 74 in the battery compartment 67.

A middle or intermediate compartment 81 is defined by cross wall 69, portions of the top and bottom panels 51 and 52, right side panel 53, removable left side panel 58, and a front cross wall structure 82, with the latter fitted into front panel portion 55 as shown in Fig. 2. The middle compartment 81 is sub-divided by a vertically-extending, longitudinal partition plate 83 into two chambers, 84 on the left side and 85 on the right side, as is best seen from Figs. 3 and 4. The partition plate 83 carries in the left side chamber 84 a pair of laterally-extending, longitudinal strips 86, 86, spaced one above the other, and which, together with a face plate 87 fixed thereto and portions of the partition plate 83, define a shaft chamber 88. A front portion of the right side chamber 85 serves as a light source compartment.

Within the shaft chamber 88 is rotatably supported, on a horizontal axis extending longitudinally of the casing 50, a main drive shaft assembly 89 which carries fixed thereto, in successive order from the rear end thereof, a worm gear 90, a worm 91, a drum or barrel shutter 92, a single lobe or heart cam 93, and a vane or plate shutter 94, with the front end of the shaft assembly extending through the front cross wall 82 for location of the cam and vane shutter forward of this front cross wall, as is best seen in Fig. 2. The main drive shaft 89 does not actually extend as a unitary element through the barrel or drum shutter 92 but the latter has one end thereof fixed to one end of the main section of the drive shaft 89 and the other end thereof fixed to a front stub section 95 which extends through front cross wall 82 and forward of the latter carries the heart cam 93 and the vane shutter 94.

The drive shaft 89 is driven by its worm gear 90 meshed with a worm 96, which is fixed upon a motor shaft 97 with those two elements extending from the right side chamber 85 through a hole in partition plate 83 into the shaft chamber 88, as will be understood from Figs. 2 and 4. The worm 91 on the shaft 89 is meshed with a worm gear 98 fixed on a short cross shaft 99 in shaft chamber 88 with one end of that short cross shaft being rotatably supported by shaft chamber plate 87 and the other end thereof rotatably supported in right side chamber 85 by a bracket 100, as is best seen in Fig. 4; and bracket 100 is supported on partition 83. The motor shaft 97 is carried by rotor 101 of an electric motor 102 in chamber 85 and with that motor provided with an A.C.-D.C. field winding 103, as is indicated in Fig. 4.

The terminal wire 80 of the D.C. electrical wiring within the casing 50 leads to one terminal 104 of the motor winding 103 and the other terminal wire 79 is connected to a resilient contact arm or leaf 106 of a circuit switch having its other contact in the form of another resilient contact arm or leaf 107 of electrically conductive metal. The switch leaf 107 is connected to the other motor terminal 115. Thus, dry cells 68—68 are connected by suitable battery circuitry in series with the switch comprising contact leaves 106 and 107 and the motor winding 103, and a pair of circuit connector terminals on a four-terminal circuit connector 111 are connected in parallel with the switch and dry cells to the two motor winding terminals for alternate supply to the latter of suitable A.C. power, such as that of a household electrical supply circuit for A.C. operation when the battery D.C. circuit is broken at the switch. The D.C. operation of the motor 102 is intended for camera operation of the apparatus and the A.C. operation of the motor is intended for projector operation thereof.

Such circuit connectors and the switch leaves 106 and 107 are supported on a plate 116 of insulating material, such as Bakelite, in turn supported by posts 117 mounted on the inner face of right side wall panel portion 53, as is shown in Fig. 4. The inner face of right side wall panel portion 53 carries a bracket strip 118 which, as is shown in Fig. 4, has an upper edge spaced inward of the inner face of the side wall slidably to receive therebetween a switch operating or control slide or plate 119 adapted for reciprocation back and forth along the inner face of this side wall. The switch control plate 119 carries manual trigger means in the form of a centrally-engageable projection or thumb button 120 which extends through an elongated, horizontally-extending slot in the right side wall panel portion 53, as will be best understood from Figs. 2 and 4. The switch control plate 119 carries on the inner face thereof an insulated finger or post 122, the path of which is intercepted by switch leaf 106 so that when the slide 119 is pushed forward, the switch leaves 106 and 107 will be brought to contact of each other to close the D.C. battery circuit. The switch control slide plate 119 is spring-biased by relatively weak helical spring 123, having one end connected to switch operating post 122 and the other end fixed to the right side wall panel portion 53, as will be best understood from Fig. 2. The biasing of the switch control slide 119 is backward away from the switch leaf 106 and thus to a circuit-open position herein termed the "projector" position as will be understood from the description relative to projection operation set forth hereinafter. The opposite end of the path of travel of the switch control slide 119 is forward and considered the "camera" or switch-closing position thereof, and the slide has an intermediate "neutral" position.

As will be noted from Figs. 2 and 4, the worm 91 on drive shaft 89 is meshed with gear 98 on the short cross shaft 99 to drive pulley 124 fixed on that cross shaft and about which is lapped belt 125, in turn lapped about pulley 126 fixed on shaft 127 which is rotatably supported through partition 83. Shaft 127 fixedly carries in left side chamber 84 a take-up reel spindle 128 for camera operation, as will be seen from Figs. 1, 2 and 4. Partition 83 pivotally supports at 129 in left hand chamber 84 a pivoted arm 130 which rotatably carries, on its free outer end, spindle 131 to support the projector take-up reel. As seen in Fig. 1, a pulley 132, fixed to projector take-up reel spindle 131, has lapped thereabout a crossed belt 133, in turn lapped about a pulley 134 fixed on shaft 127 with camera take-up reel spindle 128, the functioning of which will be explained later. The partition 83 also rotatably supports another shaft 135 above shaft 127 and, as will be understood from Figs. 1 and 4, shaft 135 rotatably carries in left hand chamber 84 spindle 136 adapted to support the camera supply reel. The shaft 135 carries fixed thereto in left hand chamber 84 an arm 137 which, as will be seen from Figs. 1 and 3, carries on its outer end a fixed stub shaft 138 which is to support for free rotation thereon the projector supply reel.

The shaft 135 carries in right hand chamber 85 an arm 139 also fixed thereto, so that it will be rotated when the projector supply reel supporting arm 137 is swung up and down. As is more clearly illustrated in Fig. 5, arm 139 is in the form of blind-operating means or vane, having on one end thereof a target-like blind 140 to cover an optical aperture 141 in a fixture 142 fixed about a hole in partition 83 to form a light path between light source compartment portion of chamber 85 and the drum or barrel shutter 92. Blind and 139 preferably carries beyond its supporting shaft 135 a latch segment 143 having one notch 144 in which a spring detent 145 is to engage temporarily to hold the blind 140 in the full line closed position shown in Fig. 5. The latch segment also has another notch 146 in which detent 145 is to engage when the blind arm is swung up to the dot-dash position 639 (as illustrated by dot-dash lines in Fig. 5) by upward swing of the projector supply reel-supporting arm 137. Thus, when the apparatus is to be used as a camera, fogging of the film in the left hand chamber 84 is prevented by closing off passage of light through the slotted light source cover 59 by the blind 140 merely with retraction or downward swing of the projector supply reel-supporting arm 137 into the left hand chamber for housing therein to permit closure by the side panel cover 58.

Figure 5:
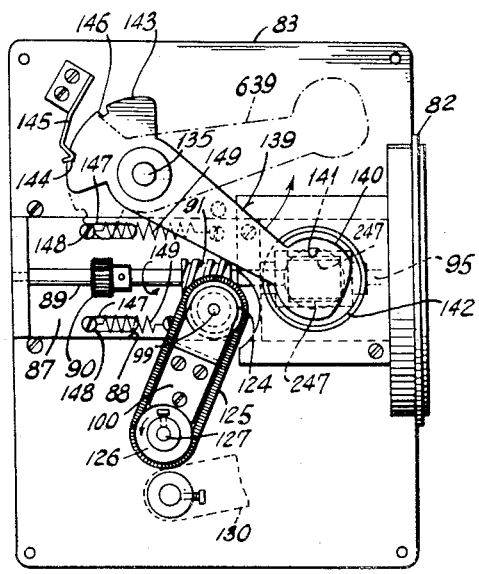
Fig. 5 is an elevational detail of the central longitudinal partition of a mid-section of the apparatus of Figs. 1 to 4 incl. as viewed from the right side and showing mechanisms supported thereon.

As will be understood from Figs. 1 and 5, the fixed side wall plate 87 of shaft chamber 88 has a pair of slots 147, 147 in which headed pins 148, 148 are slidably received and each of which, in turn, has anchored thereto one end of a helical tension spring 149, with the other end of each tension spring suitably fixed to the plate 87 so as to urge these pins to forward positions. The pins 148, 148 are carried on the rear face of a sliding plate 150, to slide forward and back in chamber 84, along the front face of fixed plate 87 as guided by the pins in the slots 147, 147. Sliding plate 150 carries in left side chamber 84 a housing 151, fixed thereto, and a pair of vertically-spaced, round fixed film guide posts 152, 152 as is best seen in Fig. 1. The housing 151 is slidably disposed about an oblique mirror support 153 mounted on fixed plate 87, and this support is notched at 154 to provide a stop for a spring-biased latch 155 on the housing 151, as will be seen from Fig. 2. The mirror support 153 is faced with a mirror 156 obliquely disposed opposite barrel or drum shutter 92; and the mirror support carries a lens 157 through which reflected rays are to be projected forward, as will be more fully understood in connection with the description of the apparatus as conditioned for projection operation hereinafter set forth.

The mirror and lens housing 151 carries on the front thereof a plate 158 which constitutes the film pressing or gate plate. A gate aperture is provided in gate plate 158 to constitute the projection aperture. The gate plate 158 is floatably carried by the retractable housing 151 and it is opposed by fixed track means in the form of a fixed aperture plate 164 constituting a portion of the fixed front cross wall 82, such as by being mounted across a hole therein, as will be understood from Fig. 2. The fixed wall track plate 164 is provided with a hole 165 constituting the camera aperture and which is aligned with projector aperture 162 to serve as a common optical window, being slightly larger in width and length than the latter in accordance with good camera and projection practice. The light path forward from the film track or path through the aperture 165 is common to both camera and projector operation, as will be understood from the operation hereinafter described.

The front cross wall structure is formed by the plate 82 and the front panel portion 55 into a side notch in which it is securely seated. The plate 82 is cupped or provided with a cylindrical recess 168 which, together with cover plate 60, provides a chamber in which is housed the vane shutter 94 and the film advancing mechanism including cam 93 which is rotatably carried by section 95 of the main drive shaft 89. As partially shown in Fig. 2, a bracket 169 is pivotally mounted by a screw 170 to the inner face of the chamber or bottom of the recess 168. The pivoted bracket 169 has a pair of ears between which a claw frame 172 is pivotally supported. Claw frame 172 is biased inward by a leaf spring 173 and has a rectangular hole therein to provide a cam follower frame in which the single lobe cam 93 rotates for up and down swing of the former. Claw frame 172 carries on its outer end an inwardly-projecting pull down claw 175 which extends back through one side of the film track aperture 165 for up and down movement therein, and the end or rear edge of the claw is provided with an oblique camming surface to cam the claw out of the marginal perforations of the film.

The circular front plate 60, which serves as a cover for the front cross chamber or recess 168, rotatably carries the turret plate 61 by means of a pivot screw 186, and a detent 187, preferably in the form of a spring-biased ball, as seen in Fig. 2, temporarily locks the turret plate in any one of a plurality of positions selectively to hold the camera and projector lenses 62 and 63, or other lens mounted thereon, aligned with the fixed wall plate optical path aperture 165.

As will be seen from Figs. 2 and 3, the light source compartment (the front portion of right side chamber 85) suitably houses an electric light socket 196 which removably receives an electric lamp or light bulb 197. Light bulb 197 is partially surrounded by a tubular shield 198 having a hole 199 in the side thereof facing the drum or barrel shutter 92 and between which is interposed a suitable condenser lens 200. A terminal 201 of the circuit connector 111 (mounted inside the apparatus behind the access hole 194) is connected by a wire 202 to one terminal of the lamp socket 196 and another terminal 203 of the connector 111 is connected by a wire 204 to the other terminal of the light socket. Thus, connector terminals 201 and 203 when connected to an external source of electric power, such as a household A.C. electrical supply circuit, will light the lamp 197 to serve as a light source for projection operation.

In operation of the apparatus illustrated in Figs. 1 to 5 incl. as a camera for taking motion pictures, the operator may, if desired, remove the lamp 197 from compartment 85, but this is not necessary since it may remain housed therein during camera operation. The removable panel 58 on the left side of the casing 50 will be removed for loading the camera. After removal of panel 58 the slide plate 150 in left side chamber 84 will be manually retracted to its rear position, as indicated in full lines in Fig. 2, to engage the latch 155 on the moveable mirror housing 151 with the notch 154 on the fixed oblique mirror support 153. This separates the floating gate plate 158 from the fixed aperture plate 164 so as to permit ready reception therebetween of a strip of non-exposed double-width film 185, indicated by dot-dash lines in Fig. 1. The strip of double-width film 185, which may be 16 mm. in width, is spooled up on supply reel 205, indicated in dotted lines in Figs. 1 and 4, and the latter will be mounted on non-driven supply reel spindle 136. The leading end of the strip of double-width film 185 will then be trained over the top guide post 152 and down between the fixed wall plate 164 and the retracted gate plate 158 to beneath the bottom guide post 152, and thence up over a take-up reel 206, shown in dotted lines in Figs. 1, 2 and 4 as being mounted on driven spindle 128 for rotation thereby. The latch 155 will then be pivoted by finger pressure to swing its front end outwardly out of notch 154 to permit the housing 151 and slide plate 150 to move forward so that the floating gate plate 158 snugs the double-width film 185 up against the rear face of fixed aperture plate 164, and with those two plates defining therebetween a film path. The removable side panel 58 is then replaced to close the camera casing. The switch control button 120 will be in the "neutral" or middle position, as illustrated in Fig. 2. The turret plate 61 will be rotated to bring the camera lens 62 to alignment with the camera aperture 165 in the fixed aperture plate 164, and the apparatus is thus readied for camera operation, assuming that the dry cells 68—68 have been suitably loaded in the battery compartment 67.

When one wishes to take pictures with the loaded camera apparatus, the telescopic finder 66 serves its usual function and the operator pushes forward on the switch control button 120 to slide the control plate 119 forward from the "neutral" or middle position illustrated in Fig. 2 to the "camera" position, causing the insulated pin 122 to push the switch leaf 106 to circuit closing contact of switch leaf 107. Thus, the battery circuit leading to the D.C.-A.C. motor winding 103 is closed and, as a result, the motor rotor 101 will be rotated by battery power to rotate the driving worm 96.

Since driving worm 96 is meshed with worm gear 90, fixed on main shaft 89, the latter will be rotated counterclockwise, as viewed from the rear. Shaft 89 rotates worm 91 to rotate worm gear 98 to drive pulley 124 with the latter driving pulley 126 by belt 125 so as to drive the lower transverse shaft 127 to rotate take-up reel spindle 128 clockwise, as viewed in Fig. 1. This will apply tension on the double-width unexposed film 185 to spool it up as it is delivered down the film track along the film path between the fixed aperture plate 164 and the biased gate plate 158 by means of the feeding mechanism or pulldown claw device.

During each complete rotation of shaft 89 through 360°, the claw 175 is biased by leaf spring 173 at an upper position to engagement in any one of the side film perforations. The cam 93 is rotated in follower frame 172 to cause claw 175 to pull the double-width film 185 downward a distance equal to one-half the length of a picture frame and thereafter without pause to continue downward. The rotary vane shutter 94 is so timed with respect to the cam 93 such that a cut-out or cut-back portion extending over about 230° of the shutter vane will uncover the camera aperture 165 during the time the double-width film 185 is held stationary therebehind (with the claw 175 disengaged and returning upward) for efficient exposure of a picture on one longitudinal half of the double-width film (that on the right side as viewed from the rear). The portion 94 of the shutter vane closes off the camera aperture 165 for about 130° of one rotation of the drive shaft 89, while the cam 93 is pulling the double-width film downward. The claw 175 is vertically wider than the length of each film perforation so that only the pointed tip of the oblique claw nose extends into the perforation, and thus the lightly biased claw will be cammed out of each perforation to be lightly dragged along the film face up from the lower advance position during its lifted return movement to its top engaging position.

The camera unit 50 of the Figs. 1 to 5 incl. embodiment is intended to be supplied along with a suitable supporting base unit 214, as seen in Fig. 6, with the latter having front feet 215, 215 and rear feet 216. When it is intended to employ the camera-projector apparatus as a projector, as illustrated in Fig. 6, the base unit 214 not only serves as a support for the encased camera unit 50 but also as part of the operating mechanism. For this purpose the base unit 214 includes a 110 v. A.C. motor, indicated in dotted lines at 218 in Fig. 6, which operates a suitable fan or blower housed therein, also indicated in dotted lines in Fig. 6 at 219, the blower being provided with an upwardly-extending outlet duct or tube 220 which is receivable in a hole 221 in the bottom of light source chamber 85, indicated and shown in Fig. 3, so as to direct cooling currents of air up about the lamp 197. Power is supplied to the A.C. motor by means of a flexible supply cord 222, connectable to a 110 v. A.C. household electrical supply circuit and lamp circuit wiring is connected in parallel thereto through a switch 223 by means of a four-conductor cable 224, terminating in a female connector adapted to be engaged through the hole 194 of the camera casing with the connector 111 and its four male prongs. The two male prongs 201 and 203 will thus supply current to the lamp 197 through two of the four conductors of cable 224. The base unit 214 also houses a conventional step-down transformer (not shown) with its primary winding connected through switch 223 to the A.C. supply conductors 222. The secondary winding of the transformer is connected through a rheostat 233 to the other two of the four conductors of cable 224 to supply A.C. current to the motor 102 at the other two male prongs of connector 111 for A.C. operation thereof during projector operation.

The camera-projector encased unit 50 will be mounted as a superstructure upon the base unit 214 for projector operation by inserting the outlet tube 220 of its blower in the hole 221 in the bottom of the lamp compartment 85, as is indicated in Fig. 3, and this tube may be removably locked thereto by any suitable means. An elevation-adjusting means 234 on the base unit 214 engages the camera-projector superstructure 50 for adjustment of the elevation of the back end of the latter relative to the base unit.

In operation of the projector assembly illustrated in Fig. 6, the operator will remove the left side panel or cover 58 and swing the arm 137 upwardly about the axis of the camera supply reel spindle 136 to an extended position, such as that illustrated at the top of Fig. 6, any suitable means being employed temporarily to hold it in such position, such as frictional drag between the far face of the arm 137 against a top edge flange of the projector casing structure. A loaded projector supply reel 241 will be mounted for free rotation upon the fixed spindle stub 138 carried by the outer end of the arm 137, and temporarily held thereon by a pivoted latch 242. The developed strip of film which is spiraled on supply reel 241, illustrated in dot-dash lines at 209 in Fig. 6, may be of a single width, such as that obtainable by splitting longitudinally the double-width film 185 after exposure of two longitudinal rows or series of picture frames on the two marginal halves thereof. As shown in Fig. 6, the single-width film 209 will be trained about the top guide roll 152, then down between the fixed aperture plate 164 and the gate plate 158, thence about the lower guide roll 152, and finally to a lower take-up reel 243 indicated in broken lines in Fig. 6. The projector take-up reel 243 is mounted for drive upon the spindle 131 which carries an oblique fin or key means 244 in the form of a wire loop, as may be best seen in Fig. 3, so as to engage in a slot in the hub of the usual projector take-up reel. The take-up reel 243 assumes the lower position alongside the left side of the base unit 214, as illustrated in Fig. 6 with swing of the arm 130 downwardly to tense the crossed resilient spring belt 133 about the pulleys 132 and 134 with the latter being driven from the shaft 127 which drives the camera take-up reel spindle 128, with the latter serving no useful purpose in this projector operation. The pivoted arms 137 and 130, which respectively support the projector supply reel 241 and take-up reel 243, thus are readily pivoted to extended positions so that the apparatus will accommodate the larger projector reels commonly used while permitting swing back into the open left side chamber 84 to permit closing thereof for camera operation.

The longitudinal partition 83 substantially sub-divides compartment 81 and thus, with the driven pulley 134 and pivoted arm 137 positioned only a limited distance to the left therefrom for housing in the casing unit 50 with replacement of side cover panel 58, provision must be made for clearance between the left side of the base unit 214 and the arm 137 with the projector take-up reel 243 supported on the latter. Such is accomplished by the provision of an arcuate recess 248 shown in Fig. 6 perhaps to a shallower extent than it may be in the actual construction merely to avoid confusion in the showing of the other associated parts. The single-width developed film 209 which is to be used in projection operation is led between the left sides of the fixed aperture plate 164 and the gate plate 158 so that the single row of claw perforations along the left margin thereof will be in engageable position relative to the claw 175 of the pull-down mechanism.

When the camera-projector unit 50 is so conditioned for projector operation with mount thereof on the base unit 214, the aperture 162 in the gate plate 158 serves as the effective aperture. As will be best understood from Fig. 2, the optical path of projector operation includes the lamp 197 as the light source, the condenser lens 200, light passage aperture 141 uncovered by vane 140, the rotary drum or barrel shutter 92, the oblique mirror 156, lens 157, the gate aperture 162, optical window 165, and the projector lens 63 mounted upon the turret assembly 61. The rotary drum or barrel shutter 92 is transversely slotted to provide a lateral through opening 246 (Fig. 3), through which the light rays are to pass from the condenser lens 200 to the oblique mirror 156. Diametrically opposed portions 247, 247 of the drum shutter structure 92 remain to form shutter means to intercept the optical path or light rays passing therealong twice during each single revolution of the drum shutter. Preferably the rotary plate or vane shutter 94 has an optical path-intercepting portion extending through about 130° and, thus, the intercepting portions 247 of the drum shutter preferably also extend through similar 130° angles and the former is synchronized with one of the latter so as not to interfere with a beam of light which is passed through the opening or slot 246 in the drum shutter as it passes forward from the oblique mirror 156 along the common portion of the optical path for both camera and projector operations.

On camera operation the rotary vane or plate shutter 94 is alone employed for interception of that portion of the optical path which is common to both camera and projector operations, and the drum or barrel shutter 92 is employed on projector operation for interception of the projection optical path back of the film track with the vane shutter 94 in front of the film track so synchronized as to have no effect on the projector operations. It will thus be seen that in camera operation during each revolution of the main shaft 89 while the film is stationary behind the camera aperture 165, there is exposure of the film emulsion in one frame area during 230° of the shaft revolution; and during projector operation the rays of light are permitted to pass through the developed frame of the stationary single-width film twice during each revolution of the main drive shaft so as effectively to reduce flicker in the projected pictures.

It will be noted that when the camera-projector apparatus is conditioned for projector operation, as illustrated in Fig. 6, the upward swing of arm 137 to the shown extended position for reception and support of the projector supply reel 241 causes the blind arm 139 to pivot upwardly to the dot-dash position 639, as illustrated in Fig. 5, so that the blind 140 uncovers the light passage or hole 141 to permit light rays to pass from the light source lamp 197 through the partition 83 to the barrel or drum shutter 92 and thence to the oblique mirror 156. On camera operation, however, the blind 140 effectively closes light passage or hole 141 to prevent leakage of light into left side chamber 84 to avoid fogging of the film. When one conditions the camera-projector apparatus as a projector as illustrated in Fig. 6, plugging of the female connector on the end of four-conductor cable 224 in through the hole 194 for circuit connection with the male connector 111 in the encased unit 50 may hold open the battery circuit. However, this plug-in connects the motor terminal wires 104 and 115 through the rheostat 233 to the transformer secondary in the base unit 214 for supply thereto of A.C. power from the transformer primary when the switch 223 on the side of the base unit is closed. Closure of the switch 223 also closes the circuit of the light source lamp 197 and the blower motor 218 is operated from the time the supply cable 222 is plugged into the household A.C. supply circuit. If desired, the switch 223 may be so located as to control not only the motor and lamp circuits of the superstructure unit 50 but also the circuit of the blower motor 218 in the base unit.

With the projector circuits energized, the blower 219 delivers air up through its outlet duct or tube 220 and hole 221 into the lamp chamber 85 past the energized lamp 197 for keeping the latter cool. The A.C. operation of motor 102 operates the mechanism within the camera-projector apparatus so as to pull down step-by-step the single-width film 209 past the optical aperture 162 in the gate plate 158. Light rays pass laterally from the light source 197 through the condenser lens 200 and the barrel shutter 92 to be reflected by the oblique mirror 156 forward through the lens 157, the gate aperture 162, a picture frame, the optical window 165, and finally through the projector lens 63, with the light beam being interrupted twice by the barrel shutter during each pause of a picture frame opposite the projector aperture. The motor 102, being of the D.C.-A.C. type, effectively operates on the A.C. current at the reduced voltage delivered by the step-down transformer in the base unit 214.

The camera-projector apparatus of Figs. 1 to 6 incl. thus provides blind means to shut off leakage of film-fogging light through the projector light passage into the film chamber or compartment which is automatically closed when the camera unit, constituting the superstructure thereof, is conditioned for camera operation, and which is automatically moved to open position for passage of light from the projector lamp to the film gate when parts of the superstructure unit are manipulated in setting it up for projection operation. The camera unit may be improved in accordance with the teachings of the present invention by assuring that there also will be no appreciable light leakage back through the front optical window or film track aperture unduly to fog unexposed film therebehind during periods of use of the unit as a camera while pictures are not being taken. Thus, in accordance with the present invention, blind means are provided for this purpose which effectively will close the front optical window or film track aperture automatically during periods when the camera unit is not in use either for taking pictures or projecting them, and which will efficiently uncover such window or aperture as parts are manipulated either to cause camera operation in the taking of pictures or to set up the unit as a projector superstructure for projection operation. The camera-projector apparatus as designed for commercial market, parts of which that are pertinent to the present invention being illustrated in Figs. 7 to 15 incl., embody such combined automatic blind means which effectively prevent leakage of film-fogging light into the film chamber through both the projector light passage and the front optical window.

As will be seen from Figs. 7 to 15 inclusive, the camera unit 250, which is to constitute the superstructure of the projector when mounted in superposed position upon base unit 414, has the entire left side thereof covered for camera operation by a pan-shaped removable side cover 258, which has been omitted in Fig. 8 for view of the mechanism therebehind although the unit in that figure is conditioned for camera operation, and such side cover is absent from Figs. 12 and 15 since the unit there is conditioned for projection operation. Suitable latching means are provided inside the left side cover 258 detachably to engage a latching post 520 supported by a plate 522 which covers certain reel driving mechanism and which in turn is mounted upon longitudinal partition 283 by suitable spacing means to define a housing space therebetween for such drive mechanism, as may be understood from Figs. 8 and 15.

The right side of the casing of the camera-projector unit 250 is defined in part by a fixed mid-panel 253 carrying manual trigger means to cause the housed operating mechanism to function on camera operation which, for electrical operation, will be in the form of thumb slide button 320 that operates the D.C. motor circuit switch. A hinged battery compartment door 257 and grilled cover sections 259 and 1259 for the projector lamp compartment cooperate with mid-panel 253 to complete the casing right side. Fixed top panel 251 cooperates with a top lateral portion 2259 of the lamp house cover section 259 and a top wall 1258 of the left side cover 258 to serve as the top of the camera unit casing, as will be best understood from Fig. 7. The bottom of the casing of the camera-projector unit 250 is defined by a panel 252 and a bottom wall 2258 of the left side cover 258, and the back of the casing is defined by a panel 256 which also defines the back side of the battery compartment behind the battery door 257. A front wall 3258 of cover 258 and a fixed front panel 255 together constitute the front of the casing of the camera-projector unit 250. Front panel 255 carries in front of side cover 258 a forwardly extending circular wall 282 defining a head chamber 368 closed off by front cover plate 260, as shown in Fig. 11, with turret assembly 261 rotatably mounted thereto by stud bolt 386. A pair of spring-biased balls 387, 387 carried in bores 587, 587 in head wall structure 282 determine four positions of the turret head structure 261 so that a camera lens 262 and a projection lens 263 carried thereby may be respectively brought to alignment with the front optical window or film track aperture 365, as will be understood from Figs. 7, 8, 9, 10, 12 and 15.

The front portion of right side compartment 285, which is divided off from the left side compartment 284 by the longitudinally extending mid-partition 283, immediately behind the front wall panel 255 constitutes a projector light source or lamp recess 575, such lamp and its supporting bracket and socket being omitted in the Figs. 9 and 14 views for clarity but when mounted in position on ledge 578 is suitably located behind the grilled lamp house cover sections 259 and 1259.

Main drive shaft 289 which operates the film translating mechanism or intermittent and the shutter mechanism, both on camera operation and on projection operation, is located in right side compartment or chamber 285, as will be best understood from Fig. 14, having its front end suitably supported through the front wall panel 255 by bearing unit 1255 carried thereby so that the front end of this shaft extends into the head chamber 368, as will be seen in Figs. 9 and 11. Main drive shaft 289 is to be driven on camera operation by a D.C. motor, such as that proposed in the embodiment of Figs. 1 to 6 inclusive, and on projection operation by any suitable A.C. power means which can be the same motor or may be a separate A.C. motor in the base unit 414 suitably geared thereto, e.g. blower motor 218 of Fig. 6 as proposed in the copending application of John W. Oxberry for Combined Camera and Projector, Serial No. 709,248, filed January 16, 1958. As in the apparatus illustrated in Figs. 1 to 6 inclusive the manual slide button or trigger 320 on the right side panel 253 of the casing of the camera-projector unit 250 operates the switch in the battery circuitry of the D.C. motor, so that when it is pushed forward from the full line position shown in Fig. 9 to the dot-dash position indicated therein the D.C. motor causes the main drive shaft 289 to be rotated and when it is retracted the battery circuit is broken to permit the D.C. motor to stop, thereby discontinuing rotation of the main drive shaft. At 423 in Fig. 15 is indicated the switch for the A.C. circuit of the motor (not shown) housed in the base unit 414 which may be employed for drive of the main drive shaft 289 on projection operation through suitable shafting and gearing.

In front of bearing unit 1255 in chamber 368 the front end of main drive shaft 289 carries a single lobe cam 293 which rotates within a rectangular claw frame 372 pivotally supported by a pin 671 to a pair of ears 371, 371 carried by a pivoted bracket 369, in turn pivotally supported by a pin 370 mounted upon the back wall 476 of head chamber 368, and a suitable biasing spring (not shown) is employed to keep the claw frame 372 in an inward position on the downward stroke while permitting outward swing on the upward stroke for step-by-step downward translation of the film past the film track aperture 365. Claw frame 372 carries a claw 375 which has a tip turned back at right angles to reach back through elongated slot 366 in the back wall 476 of head chamber 368 for engagement in perforations of the film which is held snugly against the film track on the other side of this back wall in left side chamber 284. This film intermittent mechanism will be best understood from Figs. 9, 10, 11 and 12.

The back wall 476 of the head chamber 368 has a large rectangular hole 477 therein, as best seen in Fig. 14, which is covered in the head chamber by fixed plate 1476 and the latter is spaced forward of the front face of this back wall a sufficient distance to receive therebetween flat swinging or rocker arm 480 pivotally mounted for free swinging action about the main drive shaft 289 between the bearing unit 1255 and the cam 293, as will be understood from Figs. 11 and 14. The top end of swinging arm 480 is provided with a rearwardly extending finger 485, which projects into the lamp house recess 575 of right side chamber 285, and a hole therein loosely receives therethrough the bottom end 482 of a bent spring wire lever 483 of the first class pivotally mounted at 484 by a pin to the plate 1476. The swinging arm 480 carries in the head chamber 368 a suitable stepped shaft 486 on which is rotatably mounted a planet spur gear 479 meshed with a sun spur gear 478 fixed to the front end of main drive shaft 289 in front of cam 293, as is best seen in Fig. 11. Planet gear 479 has fixed thereto a rotary vane shutter 294 to be rotated therewith.

The rotary vane shutter plate 294, fixed to the planet gear 479 for rotation thereby, has two circular zones with one zone being provided for cooperation with the front optical window or film track aperture 365 on camera operation and the other zone being provided for cooperation with the gate aperture 362 on projector operation. As will be seen from Figs. 10 and 12, the film track aperture 365 is larger than the gate aperture 362, which is aligned therewith and located therebehind, so that on camera operation the larger film track aperture is the effective aperture which permits rays of light to come into the gate mechanism to effect exposure of the film and the smaller gate aperture on projection operation is effective in permitting the projector light rays to pass out through the image-bearing film translated through the gate mechanism and then through the film track aperture serving as an optical outlet window. As will be seen in full and dot-dash lines in Fig. 12, the vane shutter plate 294 preferably is provided in an inner zone with three symmetrically arranged arcuate cut-outs each extending through about 48° and with plate structure intervening any two thereof forming light cut-off shutter vane structure extending through about 72°. Such cut-outs are formed by arcuate slot 487 and a pair of notches 1487, 1487. Preferably the second zone is located marginally of the circular shutter plate 294, radially beyond the inner zone in which the three cut-outs 487, 1487 and 1487 are provided, and this zone is cut away in the forming of the cut-out notches 1487, 1487 through about 180° to form a relatively short intervening vane 488 and to provide a diametrically-located relatively long shutter vane 1488 extending through about 180°. Larger vane 1488 is counterbalanced by a weight 2488 on the back of smaller vane 488. Thus, the series of three cut-outs 487, 1487 and 1487 and intervening shutter plate structure including vane 488 constitute the rotary shutter means for projection operation by cooperating with the gate aperture 362 when the shutter 294 is in one lateral position of swing of its carrying arm 480 and the shutter vane 1488 cooperates with the film track aperture 365 when the shutter is in another position of swing of its carrrying arm, the parts being conditioned for projection operation in the Figs. 12 and 13 views with the camera position of the planet gear 479 and vane 488 part of the shutter carried thereby being shown in Fig. 10.

In accordance with the present invention blind means are provided for stopping passage of light through the front optical window or film track aperture 365 when on camera operation pictures are not being taken. Such blind means is swung to an open position on camera operation of the camera-projector unit 250, and also when set up on the base unit 414 and conditioned for projecting pictures. Such blind means may be in the form of a pivoted blind vane 501 which is pivotally mounted at 502 by a stud screw to a land 503 on the head chamber back wall 476. The blind vane 501 has a target area 504 on the bottom end thereof which is to be swung over to close off the front optical window or film track aperture 365. The blind vane 501 is provided with an arcuate slot 505 in which travels a pin 506 mounted on an extension of land 503 to limit the swing of the blind vane between the window or aperture uncovering position shown in Figs. 10 and 12 and the light blocking position of alignment of the target area 504 with the optical window 365 shown in Fig. 9. The blind vane 501 has a bifurcated finger 507 provided on one side thereof and extending to the rear, as is best seen in Fig. 11, which receives in its notch an operating arm 508 provided with a lower end 509 adapted to bear against the side of planet gear shaft 486 for swing thereby in the swinging of rocker arm 480 from the camera position of Fig. 10 to the projector position of Figs. 12 and 13. Operating arm 508 is to be swung back and forth to swing or rock blind vane 501 between its ineffective position, shown in Figs. 10 and 12, and its effective light-blocking position, shown in Fig. 9. For this purpose arm 508 may be provided as an end section of a bent spring wire lever 510, which extends from out of the right side chamber 285 through a laterally-elongated slot 511 in the chamber back wall 476. The bent wire lever 510 has a mid-section 512 which is arranged substantially vertical along the right side face of mid-partition 283 and is rotatably supported thereby. Mid-partition 283 may, for example, be die cast from any suitable metal, such as zinc, and have formed thereon a pair of bosses 513, 513, each provided with a slot to receive the bent wire lever section 512 to serve as a bearing. Suitable means may be provided to hold the bent wire lever section 512 in the slots of the bosses 513, 513 in various forms and, for example, the ends of such bosses may be staked or distorted beyond the bent lever wire stock to hold the latter in the slots of the bosses. An additional slotted boss 514 may be provided on partition 283 merely to serve as a guide for the horizontal portion 521 of bent lever 510 above its mid-section 512 with the lever free to slide inward and outward in the slot of this boss. Bent lever 510 is provided with a transverse section 515 and a rearwardly extending section 516 intervening mid-section 512 and the transverse section with the latter extending toward the trigger or manual operator for the D.C. circuit switch.

If, for example, the switch manual operator or trigger be in the form of a thumb slide, such as that illustrated at 320, having an inwardly extending operator post 322, the transverse section 515 of the bent wire lever 510 may be turned upwardly normal thereto to provide an end portion 517 located in front of the thumb slide post to be in its path of travel so that when the latter is moved forward it will push against this lever end portion to pivot the mid-section 512 for lateral motion of the lever portion 521 in slot 511. This will cause lever 510 to swing its depending front portion 508 to the left side and thereby pivot the blind vane 501 from the aperture closing position, shown in Fig. 9, to the open position, shown in Fig. 10. Forward slide of the thumb button 320 so as to effect such swinging operation of the bent wire lever 510 by pushing against its end portion 517 and the relative forward positions thereof, are indicated in dot-dash lines in Fig. 9. Upon retraction of the thumb slide 320 to the full line position shown in Fig. 9, bent wire lever 510 is permitted to swing back to its initial position under the influence of a biasing leaf spring 518 mounted on partition 283 and bearing against lever section 516, as is seen in Fig. 14, so as to slide lever section 521 toward the right side in slot 511, thereby causing its front depending portion 508 to swing the blind vane 501 back to the position of closure of the optical window or film track aperture 365 as illustrated in Fig. 9.

The present invention provides in combination with the aperture blind 501 an additional blind to shut off passage of light through the light aperture 341 in the longitudinal partition 283 when the camera-projector unit 250 is used as a camera in taking pictures, and to uncover this light passage aperture when such unit is employed with the base unit 414 in projecting pictures. Such projection light passage blind as provided in the commercial embodiment illustrated in part in Figs. 7 to 15 inclusive is in the form of a blind vane 340 pivotally supported on the longitudinal partition 283 by pivot pin 519. Blind vane 340 is operated or swung up counterclockwise by the pivoted front reel support arm 337 which, in its extended or upwardly swung position indicated in dot-dash lines in Fig. 11 and full lines in Fig. 14, carries the supply reel 441 for the developed film when the assembly is used as a projector, as illustrated in Fig. 15. It will be understood from Figs. 14 and 15 that the reel support arm 337 is fixed upon a headed shaft 335 which is rotatably mounted through longitudinal partition 283 from the left side thereof. The far end of shaft 335 in the right side chamber 285 adjacent the longitudinal partition 283 carries, fixed thereto, a crank arm 339 which is connected by link 523 to a lift lever 524 pivotally supported at 525 to longitudinal partition 283. Lift lever 524 has a slot 526 therein in which rides a pin 527 mounted upon pivoted blind vane 340.

It will thus be understood from Figs. 11 and 14 that when the reel support arm 337 is in its horizontal position shown in full lines in Figs. 8 and 11, for complete housing in the left side compartment or film chamber 284 upon replacement of the left side cover 258, for camera operation, the crank arm 339 is in a lower position indicated in Fig. 11 so that link 523 depresses the end of lift lever 524 to hold blind vane 340 down in its position of closure of the light passage aperture 341. Consequently, the blind vane 340 in covering the light passage aperture 341 in longitudinal partition 283 prevents light rays which may filter through the lamp house grilled covers 259 and 1259 into the projector lamp recess 575 from passing to the gate mechanism 351. When the front reel support arm 337 is swung up from the full line position shown in Fig. 11 to the dot-dash position shown therein, and thus to the full line position shown in Fig. 14, for reception and support of supply reel 441 on the top end thereof, as indicated in Fig. 15, rotation of its shaft 335 by such upward arm swing causes crank arm 339 to swing up counterclockwise and pull link 523 upward so as to lift lever 524. Lift of lever 524 causes the blind vane 340 to be swung up counterclockwise by its pin 527 riding in the lever slot 526 so as to pivot the blind vane to a position above the light passage aperture 341, as shown in Fig. 14, to permit light rays to pass therethrough from the projection lamp recess 575 to the gate mechanism 351.

Reel support arm 337 has fixed to the back side thereof a leaf spring 528, as will be seen from Figs. 12 and 14. When the reel support arm is swung up and forward out of left side compartment 284 to its erect position shown in Fig. 15, the free bottom end of leaf spring 528 is swung up to snap back over a horizontal ledge 529 on the camera unit top panel so as to latch this reel support arm in its erect position with the light passage aperture 341 open. In order to return the reel support arm 337 to its lower folded position within the left side compartment 284, as illustrated in Fig. 8, the bottom end of leaf spring 528 is freed from above the horizontal ledge 529 by squeezing it in with one's fingers toward the back side of the reel support arm so that they both can be pivoted downwardly together on the outer side of the horizontal ledge.

Since the present invention contemplates control of the shift of the common rotary shutter 294 between its camera and projection positions initiated by operations effecting manipulation of optical window and light passage blinds, although not limited to such additional feature, the embodiment of the invention illustrated in Figs. 7 to 15 inclusive is provided with means for effecting such shift preferably from the manipulatable mechanism which operates the light passage blind on conditioning the superstructure unit 250 for projector operation. By way of example, for this purpose, the lift lever 524 which, in up and down swing, pivots the blind 340 between its open and closed positions is provided with an extension 530 that, as is best seen from Fig. 14, is turned at right angles and bifurcated to receive in its slot 531 the inturned top end 532 of bent wire lever 483. Thus, when the lift lever 524 is in its lower position illustrated in Fig. 11 to close off the light passage 341 by blind 340, the rocking lever 480 which carries planet gear 479 and rotary shutter 294 therewith is swung to the right side in the camera position illustrated in Fig. 10 so that only the larger fan-shaped vane 1488 of the rotary shutter passes across in front of the optical window 365 in shutter rotation. This position is effected by folding down the reel-supporting arm 337 into the film compartment 284, as illustrated in full lines in Fig. 8. Engagement of the outer side of the finger 485 on rocking lever 480 with the outer side face of the rectangular hole 477 predetermines this camera position of the rotary shutter 294.

When the reel supporting arm 337 is swung up to its erect position illustrated in Fig. 14, the resulting lift of the lever 524 causes the bent wire lever 483 to swing the rocking lever 480 inward to the position illustrated in Figs. 12, 13 and 14 to swing the rotary shutter 294 to the projection position in which shorter shutter vane 488 and the portions of the shutter plate which intervene notches 1487, 1487 and the arcuate slot 487 will then be rotated across the optical window 365. When the rotary shutter is shifted in this manner to the projection position abutment of the inside edge of the finger 485 on the rocking lever 480 with the inner side of rectangular hole 477 properly determines this projection position of the rotary shutter 294. Since bent wire lever 483 is made of spring wire and its parts preferably are of such proportions that there is a tendency to swing its lower end 482 which is engaged in the hole in rocking lever finger 485 farther than rock of lever 480 is permitted by such alternate abutment of the side edges of the rectangular hole 477 this bent wire lever effectively biases the rocking lever to its camera and projection positions.

It will be understood that such shift of the common rotary shutter 294 between its camera and projection positions may be effected by other means associated with the blinds in conditioning them respectively for camera and projection operations. For example, such means may be associated with the rear arm 330 which in its erect position is designed to support the take-up reel on projection operation. Also the manipulative means which is to be manipulated in conditioning the camera unit for projector operation and to which the blind means are to be connected to move them to their open positions may be the upwardly-extending outlet duct or tube 220 (indicated in dotted lines in Fig. 3) of the fan or blower in the base unit 214 which when inserted into the hole 221 in the bottom of light source chamber 85 will engage and lift a downwardly-biased slide pivotally connected to the operator of the passage light blind, such as lift lever 524 of Figs. 11 and 14, in substitution for link 523 connected thereto.

In Figs. 10 and 12 is shown a bent wire member 533 which has a pair of inturned fingers 534, 534 which reach through slots in back wall 476 to provide side guides for the half width developed film on projection operation and such fingers are biased inwardly by suitable leaf spring means 535. However, since such feature forms no part of the present invention and is more fully disclosed and claimed in the above identified co-pending application of John W. Oxberry, Serial No. 405,543, no further details thereof are deemed necessary in the present application.

Operation of the combined camera and projector apparatus illustrated in Figs. 7 to 15 incl. may be as follows. For camera operation, the camera unit 250 may be conditioned for use by removing the left side cover 258, mounting a supply spool 405 (carrying a roll of unexposed film) upon support spindle 336 and then trailing the leader end of the film 385 down through the gate mechanism to an empty take-up spool 406 on driven spindle 328 in the manner proposed in Fig. 8. For this purpose, gate unit 351 which is pivotally mounted at 536 to partition 283 is swung back to the dot-dash position indicated at 1351 therein so as to permit the leader end of the film 385 to be inserted between this gate unit and the film track on the back face of the casing head panel 255 or bottom wall 476 of head chamber 368. Thereafter, gate unit 351 is swung forward to its full line position shown in Fig. 8 and there held by suitable latch means 537 with the claw 375 reaching back through slot 366 for successive engagement in the perforations in the right side margin of the film. Upon closure of the left side compartment 284 by replacement of cover 258 and alignment of camera lens 262 with the optical window 365 the conditioned camera unit, shown in Fig. 7, is ready for camera operation.

The planet gear 479 and the rotary shutter 294 carried thereby are in their relative positions for camera operation shown in Fig. 10 by virtue of the fact that the lever 483 holds rocking lever 480 to the camera position, as illustrated in Fig. 9, since lift lever 524 is in its lower position as a result of reel-support arm 337 being in the folded position illustrated in Fig. 8. The optical window 365 is effectively closed by the blind 501 as shown in Fig. 9 since the biasing spring 518 holds lateral portion 521 of bent wire lever 510 at the right end of slot 511 so that its depending portion 508 securely biases the optical window blind to the closing position of Fig. 9. As previously explained, in the lower position of lift lever 524 the projection light passage 341 is effectively closed by the blind 340, as shown in Fig. 11.

When it is desired to take pictures, the operator pushes forward the manual control or trigger 320 on the right side of the camera unit casing so as to effect closure of the battery circuit for the D.C. motor in the unit, as previously explained in connection with the structure of Figs. 1 to 6 inclusive. Upon forward movement of the trigger means or manual control 320 to close the battery circuit switch, the transverse portion 515 of bent wire lever 510 is swung forward from its full line position to its dot-dash position, indicated in Fig. 9, against the biasing force of spring 518. As a result, the lateral portion 521 of bent wire lever 510 is swung inward toward the mid-partition 283 to the left side of slot 511 in the manner illustrated in Fig. 10 so as to pivot the optical window blind 501 counterclockwise, as viewed from the front, to its open position seen in Fig. 10. Closure of the battery circuit with forward movement of the manual control 320 causes the main drive shaft 289 to be rotated so that cam 293 will swing the intermittent up and down, so that its claw 375 will translate the double-width unexposed film down the film track in front of the gate unit 351 step-by-step for successive exposures of frames in one side zone thereof through the gate aperture constituted by optical window 365. Simultaneously, sun gear 478 rotates through planet gear 479 the rotary shutter 294 so that its 180° vane 1488 swings across the optical window once during each frame translation of the film. Since the camera take-up reel spindle 328 is suitably driven from the main drive shaft 289 the camera film is reeled up on take-up reel 406 as it is being exposed and, in doing so, causes swing of indicator finger 538, shown in Fig. 8, to operate a suitable indicator located behind window 539, shown in Fig. 7, which will inform the operator of the amount of unexposed film still remaining on supply reel 405. When picture taking operation is terminated by rearward slide of the manual control 320, the bent wire lever 510 is permitted to return under the influence of its biasing spring 518 to the position of Fig. 9 so that blind 501 effectively closes optical window 365.

When it is desired to employ the camera-projector unit 250 in projection operation, left side cover 258 is again removed and the unit is seated as a superstructure upon base unit 414, as indicated in Fig. 15. The supply reel support arm 337 will be swung up and forward to the erect position shown in dot-dash lines in Fig. 8 and in full lines in Figs. 12, 14 and 15. The take-up reel support arm 330 will be swung up and backward to its erect position as illustrated in these figures. A supply reel 441 loaded with developed film will be mounted on the support spindle 338 of erect arm 337 and an empty take-up reel 443 will be mounted upon the support spindle 331 of erect arm 330, and the latches 442 thereof will be pivoted to the reel-holding positions indicated in Fig. 15. The leader end of developed film 409 will be drawn off from supply reel 441 to be lapped against the upper side of drive sprocket 540, as shown in Fig. 15, and then forward to be threaded down in front of gate unit 351, the latter being pivoted back to permit such threading as in the case of threading of the unexposed film for camera operation previously explained. The leader end of the developed film 409 will then be led back to lap against the under side of film driving sprocket 540 and finally up to take-up reel 443. Rotation of turret head 261 will bring the projector lens 263 into alignment with optical window 365.

A.C. power is supplied through a suitable cable, such as that illustrated at 222 in Fig. 6, such as by connection of a suitable supply cord to a receptive connector indicated in dotted lines at 541 in Fig. 15, which is located on the right side of the base unit. Upon manipulation of the manual switch control 542 shown in Fig. 15, the main drive shaft 289 of the camera-projector unit 250, which is now serving as the superstructure of the projector, will cause the developed film to be translated down in front of the gate unit 351. The drive sprocket 540, being operated from the main drive shaft through suitable gearing, effects film transfer toward and away from the gate unit between the supply reel 441 and the take-up reel 443. Suitable gearing behind plate 552 shown in Figs. 8 and 15 connects drive sprocket 540 to a belt-driving pulley located therebehind about which belt 333 is lapped for drive of take-up reel 443.

When the supply reel supporting arm 337 was swung up and forward to its erect position of Fig. 15, it effected upward swing of blind 340 to open the projection light passage 341 through lift of lever 524, as indicated in Fig. 14. As lever 524 was lifted it swung the bent wire lever 483 clockwise as viewed from the rear in Fig. 14 so as to swing the rocking lever 480 to the left to its projection position, illustrated in Figs. 12, 13 and 14, thereby shifting the inner zone of rotary shutter 294 to the right, as viewed in Fig. 12, so that the three vanes intervening arcuate slot 487 and notches 1487, 1487, including the smaller vane 488, will be successively passed in front of optical window 365. As the rocking lever 480 is swung to this projection position its hub 486 contacts the depending end 509 of the bent wire lever 510 so as to swing its blind-operating section 508 to the right as viewed in Fig. 12, thereby again pivoting the blind 501 to its open position where it uncovers the optical window 365 and the gate aperture 362 located therebehind. The gate unit 351 includes an oblique mirror similar to that indicated in Fig. 2 which in the latched position of the gate unit is directly opposite the light passage 341. Similarly, light which emanates from the projection lamp to be located in the recess 575 behind the ventilating grilled cover 259 will strike the oblique mirror in the gate unit and then be directed forward to and through the gate aperture 362 to pass through the frames of the developed film 409 as it is translated step-by-step down the film track by the intermittent. Since the developed film is only about half the width of the unexposed camera film, its single row of perforations are kept properly aligned with the intermittent claw 375 by side guiding fingers provided by the guide mechanism 533 indicated in Fig. 12, details of which are omitted since it constitutes no part of the present invention.

After the developed film has been run through the superstructure operating as a projector, so as to be spooled up on take-up reel 443, it may be unwound therefrom to be wound up again on supply reel 441 by interchanging their positions on the spindles 331 and 338 to cause belt 333 to drive the supply reel for spooling the developed film back thereupon.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In a motion picture camera-projector apparatus adapted to handle unexposed film for taking pictures and developed film for projecting pictures, the combination comprising a camera-projector unit having a casing provided with a front wall and a removable cover closing an unexposed film compartment therein behind said front wall, gate mechanism housed in said film compartment, a camera operating D.C. motor housed in said casing having a battery supply circuit, a switch in said circuit having moving parts including a manual control exposed on the exterior of said casing, common driving means in said casing connectable to said motor, a projector operating drive connectable to said common driving means, shutter operating and film translating mechanism in said casing coupled to said common driving means to translate both unexposed camera film in said film compartment and developed projector film through said gate mechanism and drivable by said motor on camera operation, said casing front wall having an optical window therein in front of said gate mechanism for inward passage of external light rays on camera operation and for outward passage of projection light rays from the gate mechanism on projector operation, a ventilated projection lamp house carried by said casing, means providing in said casing a projection light passage between said lamp house and said film compartment to permit passage of projection light to said gate mechanism, a mechanically movable blind normally closing said optical window in one position and movable to another window open position, mechanical means connecting moving parts of said switch to said blind to move the latter to its window open position when the manual switch control is manipulated to close the battery circuit for camera operation, another mechanically movable blind normally closing off said projection light passage for camera operation and having another passage open position, a movable reel supporting arm folded into said film compartment to be moved to an extended position for support of a supply reel loaded with developed projection film when said cover is removed for projector operation, and mechanical means connecting said movable arm to both of said blinds to move them simultaneously to their open positions when said arm is moved to its extended reel-supporting position for projector operation.

2. The motion picture apparatus as defined in claim 1 characterized by a common camera and projector rotary shutter mounted in front of said optical window and mechanically coupled to said shutter operating means for rotation thereby in camera and projector operations, laterally shiftable means mounted in said casing in front of said window rotatably supporting said shutter for shift of the latter between a camera position and a projector position and normally held in the camera position of said shutter for camera operation, and mechanical means connecting said shiftable shutter supporting means to said reel-supporting arm to shift said shutter to its projector position when said arm is moved to its extended reel-supporting position for projector operation.

3. In combined motion picture camera and projector apparatus a camera unit adapted to serve as a camera and alternately as projector superstructure when conditioned for projection operation, the combination with encased driving mechanism for operation of contained film translating mechanism behind an optical window defining in said unit a common light path for both camera and projection operations, of a common transversely shiftable rotary shutter in front of the optical window coupled to said driving mechanism for rotation thereby, means normally holding said shiftable shutter in a camera operation position, means defining a projection light passage leading to the optical window, a movable blind normally closing the optical window, another blind normally closing the projection light passage, a manually operable camera control to effect drive of said driving mechanism for camera operation, means mechanically connecting said control to said optical window blind to move the latter to open position when said control is manually operated to effect camera operation with said common shutter held in its camera position, manually manipulatable means to be moved to a projection position for projection operation, and mechanical means connecting said manipulatable means to both of said blinds and said common shutter to shift the latter to projection position and to open both of said blinds when said manually manipulatable means is moved to its projection position.

4. In combined motion picture camera and projector apparatus a camera unit adapted to serve as a camera and alternately as projector superstructure when conditioned for projection operation, the combination with encased driving mechanism for operation of contained film translating mechanism behind an optical window defining in said unit a common light path for both camera and projection operations, a D.C. motor and battery circuitry therefor in said unit for camera operation of said operating mechanism, of a common transversely shiftable rotary shutter in front of the optical window coupled to said driving mechanism for rotation thereby, means normally holding said shiftable shutter in a camera operation position, means defining a projection light passage leading to the optical window, a movable blind normally closing the optical window, another blind normally closing the projection light passage, a switch in the battery circuitry having an opening and closing manual control to effect drive of said driving mechanism for camera operation, means mechanically connecting said control to said optical window blind to move the latter to open position upon closure of said switch by said control for camera operation with said common shutter held in its camera position, a pivoted arm for supporting a developed film reel folded into said casing for camera operation and manually swingable thereoutof to a reel-supporting position for projection operation, and mechanical means connecting said arm to both of said blinds and said common shutter to shift the latter to projection position and to open both of said blinds when said arm is swung out to reel-supporting position for projection operation.

5. In a motion picture camera-projector apparatus adapted to handle unexposed film for taking pictures and developed film for projecting pictures, the combination comprising a camera-projector unit having light-excluding casing means including a front wall, means defining an optical window in said front wall for inward passage of external light rays on camera operation and for outward passage of projection light rays on projector operation, gate mechanism in said casing means behind the optical window and optically aligned therewith defining a predetermined common film-guiding path for alternate translation therealong of unexposed camera film and developed projector film, said gate mechanism having a through opening for passage therethrough of projector light rays emanating from therebehind, common camera and projector drive operating mechanism housed in said casing means and including means alternately to translate both types of film along the film path through said gate mechanism, mechanically movable blind means normally closing the optical window when said unit is conditioned for camera operation and movable to an optical window open position upon camera operation and when said unit is conditioned for projector operation, a power source housed in said casing means coupled to said drive operating mechanism when said unit is conditioned for camera operation to operate said mechanism and its film translating means, manually movable trigger means mounted on said casing means for external access and having an inoperative position and an operative position controlling operation of said drive operating mechanism and its film translating means from said power source when said unit is conditioned for camera operation, means mechanically connecting said trigger means to said blind means to move the latter to and hold it in its open position when said trigger means is manipulated to its operative position for camera operation, means providing a projector light passage in said casing means leading forward to said gate mechanism, mechanically movable blind means movably supported in said casing means normally closing off said passage and movable to an open passage position, mechanically manipulatable conditioning means in said casing means movable between an inoperative camera position for camera operation and an operative projector position for projector operation to condition said unit for projector operation, and means mechanically connecting said manipulatable conditioning means to both said optical window blind means and said passage blind means to move both of them to their open positions when said manipulatable conditioning means is moved from its inoperative position to its operative projector position in conditioning said unit for projector operation.

6. In a motion picture camera-projector apparatus adapted to handle unexposed film for taking pictures and developed film for projecting pictures, the combination comprising a camera-projector unit having light-excluding casing means including a front wall, means defining an optical window in said front wall for inward passage of external light rays on camera operation and for outward passage of projection light rays on projector operation, gate mechanism in said casing means behind the optical window and optically aligned therewith defining a predetermined common film-guiding path for alternate translation therealong of unexposed camera film and developed projector film, said gate mechanism having a through opening for passage therethrough of projector light rays emanating from therebehind, common camera and projector drive operating mechanism housed in said casing means and including means alternately to translate both types of film along the film path through said gate mechanism, mechanically movable blind means normally closing the optical window when said unit is conditioned for camera operation and movable to an optical window open position upon camera operation and when said unit is conditioned for projector operation, a power source housed in said casing means coupled to said drive operating mechanism when said unit is conditioned for camera operation to operate said mechanism and its film translating means, manually movable trigger means mounted on said casing means for external access and having an inoperative position and an operative position controlling operation of said drive operating mechanism and its film translating means from said power source when said unit is conditioned for camera operation, means mechanically connecting said trigger means to said blind means to move the latter to and hold it in its open position when said trigger means is manipulated to its operative position for camera operation, supplemental projector driving means carried by said casing means in an externally accessible position for coupling to an external projector driving source, coupling means in said casing means mechanically connecting said projector driving means to said drive operating mechanism, means providing a projector light passage in said casing means leading forward to said gate mechanism, mechanically movable blind means movably supported in said casing means normally closing off said passage and movable to an open passage position, mechanically manipulatable conditioning means in said casing means movable between an inoperative camera position for camera operation and an operative projector position for projector operation to condition said unit for projector operation, means mechanically connecting said manipulatable conditioning means to both said optical window blind means and said passage blind means to move both of them to their open positions when said manipulatable conditioning means is moved from its inoperative position to its operative projector position in conditioning said unit for projector operation, common rotary shutter means mounted in said casing means forward of said gate mechanism for rotary traverse of the optical path extending forward from said gate mechanism out through the optical window, mechanically shiftable means movably mounted in said casing means and shiftable between a camera position and a projector position thereof, said shiftable means rotatably supporting said shutter means in either of a camera operation position and a different projector operation position with said rotary shutter means traversing the optical path in both positions, mechanical coupling means drivably connecting said rotary shutter means to said drive operating mechanism in both of the camera and projector positions of said shutter means for drive thereof as a camera shutter when in its camera position and as a projector shutter when in its projector position, means to hold said shutter shiftable means in its camera position when said unit is conditioned for camera operation, and means mechanically connecting said shutter shiftable means to said manipulatable conditioning means to shift said shiftable means to its projector position when said unit is conditioned for projector operation.

7. In a motion picture camera-projector apparatus adapted to handle unexposed film for taking pictures and developed film for projecting pictures, the combination comprising a camera-projector unit having light-excluding casing means including a front wall, means defining an optical window in said front wall for inward passage of external light rays on camera operation and for outward passage of projection light rays on projector operation, gate mechanism in said casing means behind the optical window and optically aligned therewith defining a predetermined common film-guiding path for alternate translation therealong of unexposed camera film and developed projector film, said gate mechanism having a through opening for passage therethrough of projector light rays emanating from therebehind, common camera and projector drive operating mechanism housed in said casing means and including means alternately to translate both types of film along the film path through said gate mechanism, mechanically movable blind means normally closing the optical window when said unit is conditioned for camera operation and movable to an optical window open position upon camera operation and when said unit is conditioned for projector operation, a power source housed in said casing means coupled to said drive operating mechanism when said unit is conditioned for camera operation to operate said mechanism and its film translating means, manually movable trigger means mounted on said casing means for external access and having an inoperative position and an operative position controlling operation of said drive operating mechanism and its film translating means from said power source when said unit is conditioned for camera operation, means mechanically connecting said trigger means to said blind means to move the latter to and hold it in its open position when said trigger means is manipulated to its operative position for camera operation, means providing a projector light passage in said casing means leading forward to said gate mechanism, mechanically movable blind means movably supported in said casing means normally closing off said passage and movable to an open passage position, a removably cover constituting a portion of said casing means, folded supporting means movably mounted in said casing means behind said cover manually manipulatable to an unfolded extended position when said cover is removed for projector operation, said folded supporting means having means to carry thereon a developed film reel in the unfolded extended position of the former, and means mechanically connecting said folded reel supporting means to both said optical window blind means and said passage blind means to move both of them to their open positions when said reel supporting means is manipulated from its folded position in said casing means to its unfolded extended position and while in the latter position to hold both of said blind means in their open positions.

8. In a motion picture camera-projector apparatus adapted to handle unexposed film for taking pictures and developed film for projecting pictures, the combination comprising a camera-projector unit having light-excluding casing means including a front wall, means defining an optical window in said front wall for inward passage of external light rays on camera operation and for outward passage of projection light rays on projector operation, gate mechanism in said casing means behind the optical window and optically aligned therewith defining a predetermined common film-guiding path for alternate translation therealong of unexposed camera film and developed projector film, said gate mechanism having a through opening for passage therethrough of projector light rays emanating from therebehind, common camera and projector drive operating mechanism housed in said casing means and including means alternately to translate both types of film along the film path through said gate mechanism, mechanically movable blind means normally closing the optical window when said unit is conditioned for camera operation and movable to an optical window open position upon camera operation and when said unit is conditioned for projector operation, a power source housed in said casing means coupled to said drive operating mechanism when said unit is conditioned for camera operation to operate said mechanism and its film translating means, manually movable trigger means mounted on said casing means for external access and having an inoperative position and an operative position controlling operation of said drive operating mechanism and its film translating means from said power source when said unit is conditioned for camera operation, means mechanically connecting said trigger means to said blind means to move the latter to and hold it in its open position when said trigger means is manipulated to its operative position for camera operation, supplemental projector driving means carried by said casing means in an externally accessible position for coupling to an external projector driving source, coupling means in said casing means mechanically connecting said projector driving means to said drive operating mechanism, means providing a projector light passage in said casing means leading forward to said gate mechanism, mechanically movable blind means movably supported in said casing means normally closing off said passage and movable to an open passage position, a removable cover constituting a portion of said casing means, folded supporting means movably mounted in said casing means behind said cover manually manipulatable to an unfolded extended position when said cover is removed for projector operation, said folded supporting means having means to carry therein a developed film reel in the unfolded extended position of the former, means mechanically connecting said folded reel supporting means to both said optical window blind means and said passage blind means to move both of them to their open positions when said reel supporting means is manipulated from its folded position in said casing means to its unfolded extended position and while in the latter position to hold both of said blind means in their open positions, common rotary shutter means mounted in said casing means forward of said gate mechanism for rotary traverse of the optical path extending forward from said gate mechanism out through the optical window, mechanically shiftable means movably mounted in said casing means and shiftable between a camera position and a projector position thereof, said shiftable means rotatably supporting said shutter means in either of a camera operation position and a different projector operation position with said rotary shutter means traversing the optical path in both positions, mechanical coupling means drivably connecting said rotary shutter means to said drive operating mechanism in both of the camera and projector positions of said shutter means for drive thereof as a camera shutter when in its camera position and as a projector shutter when in its projector position, means to hold said shutter shiftable means in its camera position when said unit is conditioned for camera operation with said cover in place, and means mechanically connecting said shutter shiftable means to said folded reel supporting means to shift said shiftable means to its projector position when said reel supporting means is unfolded to its extended projector position.

9. In a camera-projector unit for use on both camera and projection operations, the combination of a casing for the unit having an optical window through which pictures are taken and projected, a movable blind pivotally supported in said casing to be swung back and forth between a position of closure of the window and a window open position, means normally holding said window blind in its position of closure of the window, means defining in said casing a projection light passage extending toward the window, a movable blind pivotally supported in said casing in a position of closure of the passage on camera operation, means to swing said passage blind to a passage open position, a manually operable camera control movable between an idle position and a camera operating position, a linkage mechanically connecting said camera control to said window blind to move the latter to open position upon manual manipulation of said control from its idle position to its camera operating position on camera operation, a reel support arm pivotally mounted in said casing manually swingable out of said casing to an extended position for conditioning the unit for projection operation, and another linkage mechanically connecting both of said blinds to said reel arm to swing both of said blinds to their open positions and to hold them in such open positions when said reel arm is manually swung to its extended position and held therein for projection operation, said blinds being simultaneously moved to their respective closing positions by the second-mentioned linkage when said reel arm is pivoted back into said casing.

10. In a camera-projector unit for use on both camera and projection operations, the combination of a casing for the unit having an optical window through which pictures are taken and projected, a movable blind pivotally supported in said casing to be swung back and forth between a position of closure of the window and a window open position, means normally holding said window blind in its position of closure of the window, means defining in said casing a projection light passage extending toward the window, a movable blind pivotally supported in said casing in a position of closure of the passage on camera operation, means to swing said passage blind to a passage open position, a manually operable camera control movable between an idle position and a camera operating position, a linkage mechanically connecting said camera control to said window blind to move the latter to open position upon manual manipulation of said control from its idle position to its camera operating position on camera operation, a reel support arm pivotally mounted in said casing manually swingable out of said casing to an extended position for conditioning the unit for projection operation, another linkage mechanically connecting both of said blinds to said reel arm to swing both of said blinds to their open positions and to hold them in such open positions when said reel arm is manually swung to its extended position and held therein for projection operation, said blinds being simultaneously moved to their respective closing positions by the second-mentioned linkage when said reel arm is pivoted back into said casing, a driven common rotary shutter swingably mounted adjacent the optical window for shiftable swing between a camera position and a projection position with said rotary shutter traversing the optical path through the window in both of its positions, and means connecting said shiftable shutter to said second-mentioned linkage for swinging shift thereof to its camera position when said reel arm is pivoted into said casing for camera operation and to its projection position when said reel arm is pivoted out of said casing to its extended position for projection operation.

References Cited in the file of this patent

UNITED STATES PATENTS

| | | |
|---|---|---|
| 1,309,798 | Folmer | July 15, 1919 |
| 1,377,322 | De Tartas | May 10, 1921 |
| 1,466,774 | Wassilieff | Sept. 4, 1923 |
| 1,536,347 | Lovejoy | May 5, 1925 |
| 1,562,283 | Beck | Nov. 17, 1925 |
| 2,148,493 | Nowland | Feb. 28, 1939 |
| 2,226,175 | Merriman et al. | Dec. 24, 1940 |
| 2,443,601 | Cisski | June 22, 1948 |
| 2,819,647 | Golick et al. | Jan. 14, 1958 |

UNITED STATES PATENT OFFICE

CERTIFICATE OF CORRECTION

Patent No. 2,950,646                                              August 30, 1960

Fritz Albert Blank

It is hereby certified that error appears in the printed specification of the above numbered patent requiring correction and that the said Letters Patent should read as corrected below.

Column 5, line 45, for "Blind and" read -- Blind arm --; column 9, line 25, for "driven" read -- drive --.

Signed and sealed this 4th day of April 1961.

(SEAL)
Attest:   ERNEST W. SWIDER

XXXXXXXXX
Attesting Officer

ARTHUR W. CROCKER
                                                   Acting Commissioner of Patents